United States Patent
Mehrvar et al.

(10) Patent No.: US 9,215,028 B2
(45) Date of Patent: Dec. 15, 2015

(54) PHOTONIC SWITCH CHIP FOR SCALABLE RECONFIGURABLE OPTICAL ADD/DROP MULTIPLEXER

(71) Applicant: Huawei Technologies Co., Ltd., Shenzhen (CN)

(72) Inventors: Hamid Mehrvar, Ottawa (CA); Dominic Goodwill, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 30 days.

(21) Appl. No.: 14/021,999

(22) Filed: Sep. 9, 2013

(65) Prior Publication Data

US 2015/0071633 A1    Mar. 12, 2015

(51) Int. Cl.
*H04Q 11/00* (2006.01)
*H04J 14/02* (2006.01)
*H04L 12/721* (2013.01)

(52) U.S. Cl.
CPC ........ *H04J 14/0212* (2013.01); *H04Q 11/0005* (2013.01); *H04L 45/62* (2013.01); *H04Q 2011/0016* (2013.01)

(58) Field of Classification Search
CPC  H04J 14/0212; H04J 14/0201; H04J 14/0267
See application file for complete search history.

(56) References Cited

U.S. PATENT DOCUMENTS

| | | | |
|---|---|---|---|
| 8,320,759 B2* | 11/2012 | Boduch | 398/48 |
| 2009/0220242 A1* | 9/2009 | Ooi et al. | 398/85 |
| 2012/0250580 A1* | 10/2012 | Testa et al. | 370/254 |
| 2012/0321306 A1* | 12/2012 | Wellbrock et al. | 398/48 |
| 2013/0028604 A1* | 1/2013 | Gao | 398/65 |
| 2013/0108215 A1* | 5/2013 | Ticknor et al. | 385/17 |
| 2014/0255026 A1* | 9/2014 | Roorda et al. | 398/49 |

FOREIGN PATENT DOCUMENTS

| | | |
|---|---|---|
| CN | 101420286 A | 4/2009 |
| CN | 102025439 A | 4/2011 |

OTHER PUBLICATIONS

Devarajan, A., et al., "Colorless, Directionless and Contentionless Multi-degree ROADM Architecture for Mesh Optical Networks", 2010 Second International Conference on Communication Systems and Networks (COMSNETS), Jan. 5-9, 2010, 10 pages.

(Continued)

*Primary Examiner* — Danny Leung
(74) *Attorney, Agent, or Firm* — Slater & Matsil, L.L.P.

(57) ABSTRACT

System and method embodiments are provided for a photonic switch chip for scalable reconfigurable optical add/drop multiplexer (ROADM). The embodiments enable a low-cost pay as you grow ROADM that scales as both the number of wavelengths added or dropped increases and the size of the node in terms of number of directions increase. In an embodiment, a ROADM includes an M degree optical cross-connect tandem component comprising M wavelength selective switch (WSS) coupled to M wavelength division multiplexing (WDM) node interfaces, where M is equal to a number of input or output directions; a routing stage wavelength selector switch (WSS) comprising a plurality of WSSs connected to the tandem component; and an N by M combiner/distributor for add/drop coupled to the routing stage WSS, wherein the combiner/distributor comprises one or more photonic integrated circuit (PIC) chips, and wherein N is a maximum number of add/drop wavelengths.

29 Claims, 6 Drawing Sheets

(56) References Cited

OTHER PUBLICATIONS

"Next Generation Optical Network Solutions," ECI Telecom, May 2009, 16 pages, ECI Telecom Ltd., Proprietary.
Fowler, J., "Next Gen Optical Networks," May 2012, 31 pages, 2012 ADVA Optical Networking.
Morkel, P., et al., "Comparison of Multi-degree Dynamic Optical Nodes," 2011, 7 pages, Panel: Tradeoffs and Drivers for Tunable/Colorless Networks OFC/NFOEC, Infinera.
Kawai, T. et al., "Multi-degree ROADM Based on Massive Port Count WSS with Integrated Colorless Ports," Optical Fiber Communication Conference and Exposition (OFC/NFORC), 2011 and the National Fiber Optic Engineers Conference, Mar. 6-10, 2011, 3 pages.
"NO Limits: The Next-Generation ROADM Network," 2010, 16 pages, Enablence Technologies, Inc., www.enablence.com.
Perrin, S., White Paper, "Building a Fully Flexible Optical Layer with Next-Generation ROADMs," Oct. 2011, 18 pages, Heavy Reading.
"Advances in ROADM Technologies and Subsystems," 2010, 12 pages, , Enablence Technologies, Inc., www.enablence.com.
International Search Report and Written Opinion of the International Searching Authority received in Patent Cooperation Treaty Application No. PCT/CN2014/086125 mailed Dec. 19, 2014, 12 pages.

* cited by examiner

PHOTONIC SWITCH CHIP FOR SCALABLE RECONFIGURABLE OPTICAL ADD/DROP MULTIPLEXER

TECHNICAL FIELD

The present invention relates to optical networks, and, in particular embodiments, to optical routers.

BACKGROUND

Growth of Internet traffic for both residential and business has allowed service providers to find ways to generate more revenues and position themselves to benefit from the addition of more and more services offered over the Internet. A lot of these services such as HDTV, gaming and real-time applications are characterized by two features. One is their stringent network requirements in terms of delay, jitter and demand for high bandwidth, and the other is their burstiness, their traffic routing patterns and unpredictable bandwidth demand. This has resulted to an operational challenge for the service providers to predict bandwidth requirements at many of their sites. It is noted that one way to cope with this challenge is provisioning high bandwidth connectivity to each one of the sites. This results in both increase in capital expenditure and network complexity.

As a result of above challenge, service providers will benefit from all optical agile networks that support reconfiguration of network resources. As part of all optical networks (AON), Reconfigurable Optical Add/Drop Multiplexer (ROADM) offers bandwidth connectivity to any site and allows grooming of node add/drop traffic. ROADMs enable transparent connectivity of many metro nodes in both ring and mesh connectivity. By definition, ROADM is an optical network element that routes optical signals directly and avoids Optical-Electrical-Optical (OEO) conversion. Integration of ROADMs into the present WDM networks is of critical value as they provide the pay-as-you-grow capability and flexibility to provision wavelengths dynamically. This allows ROADM to both pass through any separate wavelength between WDM node lines interfaces and to add/drop any separate wavelength from WDM line interfaces to add/drop ports.

SUMMARY OF THE INVENTION

In accordance with an embodiment, a ROADM includes an M degree optical cross-connect tandem component comprising M wavelength selective switch (WSS) coupled to M wavelength division multiplexing (WDM) node interfaces, where M is an integer and is equal to a number of input directions and/or a number of output directions; a routing stage wavelength selector switch (WSS) comprising a plurality of WSSs connected to the tandem component, wherein the WSSs are unidirectional components; and an N by M combiner/distributor coupled to the routing stage WSS, wherein the combiner/distributor comprises a photonic integrated circuit (PIC), and wherein N is a maximum number of add/drop wavelengths that the ROADM can add or drop.

In accordance with another embodiment, a ROADM includes a first stage, wherein the first stage comprises an M degree OXC tandem component; a second stage coupled to the first stage, wherein the second stage comprises a PIC and wherein the second stage comprises at least one of a plurality of power splitters and a plurality of power combiners, wherein the power splitters splits an input to K signals, wherein the power combiner combines K signals into an output, where K<=N is a maximum number of wavelength signals that can be added or dropped; and a third stage coupled to the second stage, wherein the third stage comprises the PIC and wherein the third stage comprises a plurality of selector switches.

In accordance with another embodiment, a network component in an optically switched network includes a tandem stage comprising an M degree tandem component, where M is a number of connections to other network components within the optically switched network; and an add/drop stage comprising a plurality of first sub-stages, a plurality of second sub-stages, and a plurality of third sub-stages, wherein corresponding ones of the second sub-stage and the third sub-stage comprise at least a portion of one of a plurality of PIC chips wherein a number of PIC chips is equal to M, wherein each output or input of the tandem stage is connected to each of the PIC chips, wherein the first stage comprises a plurality of either fixed grid or flex-grid (fg)-wavelength selective switches (WSSs), wherein the second stage comprises at least one of a plurality of power splitters and a plurality of power combiners, wherein the power splitters splits an input to K signals, wherein the power combiner combines K signals into an output, where K<=N is a maximum number of wavelength signals that can be added or dropped, and wherein the third stage comprises a plurality of selector switches coupled to the second stage.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The re-configurability of ROADM is software based and can be done remotely. In general a ROADM is transparent to the data-rate, the framing or the modulation format of the wavelengths. A ROADM network element typically includes transponders, ROADM Subsystem, Optical Service Channel, Optical Power Monitoring, Amplifiers (Pre-Amp & Post- Amp), Dispersion Compensation Module and dynamic channel equalization. In this disclosure, one focus is on ROADM subsystems.

Architecture of ROADM subsystem plays an important role in realizing low-cost, low-power, scalable, pay as you grow, agile, flexible and dynamic optical mesh networks. Some of these requirements such as flex-grid, dynamic wavelength routing and elimination of optical to electrical to optical (O-E-O) operations are addressed by prior art under the name of Colorless and Directionless, and Contention-less (CDC) ROADM architecture. What has not been addressed is the low-cost, low-power, scalable and pay-as-you grow capability of such architecture based on silicon photonics which constitute one aspect of this disclosure.

Making a scalable (with or without flexible grid) add/drop for next generation ROADM, requires a lot of power, real-estate and cost. A fixed wavelength grid (fixed-grid or fixed grid variant) network is a network in which the wavelength grid does not vary. In contrast, a flexible wavelength grid (flexible grid or flex grid or flex grid variant) network is a network in which the wavelength grid is variable. Silicon photonics, as a technology, can help to reduce cost, size and power, but its scalability needs to be addressed as it requires a massive number of waveguides at the add/drop node. As a result, it becomes nearly impossible to build an add/drop silicon photonic chip that scales with the number of directions and the number of wavelengths per direction. As an example, a ROADM with 20 directions each with 80 wavelengths requires handling of 1600 wavelengths for both express and add/drop connections. Assuming it is required for a node to support add/drop of about one-third of these wavelengths, then the total number of add/drop is about 500. To build a silicon photonic chip that can drop 500 wavelengths on each of the receivers from any 20 directions requires 20×500=10000 waveguides inside the chip. This is impossible to build unless a novel architecture is defined allowing partition of ROADM add/drop elements and its waveguide interconnects into pieces that can be designed in silicon photonics and can be scaled as both the number of directions and the number of add/drop wavelength per direction increases. Also, ROADMs with a wavelength-plane space switch core, such as those based on 3D MEMS, have poor scalability properties and high first-install cost for a minimum sized system.

ROADM design has come a long way. The first generation ROADMs was based on Wavelength Blocker supporting two degree (for ring) with fixed 100 GHz spacing. This type of ROADM neither offer channel equalization capability nor colorless and direction-less capabilities. The second generation ROADMs are PLC based which in comparison with first generation, have limited multi-degree and channel equalization capabilities. The third generation of ROADMs are wavelength selective switch (WSS) based which offer 50 GHz/100 GHz spacing and multi-degree support. However, they are neither color-less nor direction-less. The latest generation of the ROADM uses various implementation technologies such as WSS Liquid Crystal on Silicon (LCoS), PXC-based and hybrid PXC+WSS based. This generation of ROADMs offers all the features of $3^{rd}$ generation as well as CDC support. Furthermore, the current generation of ROADMs also supports fixed grid WSS and flex-grid (fg) WSS.

The next generation of ROADMs are required to support 20 degree and up to one-third of the wavelengths shall be engineered for add/drop. This means that the ROADM 200 cannot scale for M=20 with one-third add/drop as it requires large size WSS with size of say 1×59 so that 20 connections of WSS are used for working add/drop and 20 for protection and 19 for the remaining directions. Such architecture is costly, bulky, power inefficient, not scalable, and does not have pay as you grow capability.

Traditional ROADM design based on WSS, and multi-cast switches that use splitter, combiner and switches can address the requirements of flex-grid, dynamic wavelength routing and offering Colorless and Directionless, and Contention-less (CDC) architecture.

What these architectures were not able to address is how to make a low-cost, low-power, scalable and pay-as-you grow capability. Using traditional methods to build a ROADM with 20 directions each with 80 wavelengths (total of 1600 wavelengths) and with one-third of these wavelengths add/dropped is very costly, bulky, consumes lots of power and has scalability issue. The concepts of using Silicon Photonic Chip to address add/drop capability of ROADM is appealing as it potentially address these requirements.

Disclosed herein is a photonic switch chip for Reconfigurable Optical Add/Drop Multiplexing (ROADM) in an optical network. In an embodiment, silicon photonics is used for add/drop of a ROADM node and also an elegant partitioning of the add/drop Silicon Photonic Integrated Circuit (SPIC) chip in such a way that the waveguide interconnection is manageable within a chip, the chip scales as the number of ROADM directions increase, the chip scales as the number of wavelength added (or dropped) per direction increases, and the chip offers a low-cost solution with pay as you grow capability.

In an embodiment, components that must distinguish wavelengths from other wavelengths are constructed using WSS technology. WSS technology is available in a flex-grid variant and in a fixed-grid variant. For fixed grid applications, the WSS may be a fixed-grid variant or a flex-grid variant. In an embodiment, for flex-grid variant applications, the WSS should be a flex-grid variant. The disclosed photonic switch chip for ROADM scales very well for both flex-grid and fixed-grid variant embodiments.

In an embodiment, a three stage architecture for each RX (or TX) chip is disclosed. Stage 1 is part of the tandem stage and it is implementation specific. In one embodiment it could be flex WSS of 1×M where M is the number of directions. Each stage one output is connected to stage 2 of all the chips in the node. This means that a chip has M inputs (outputs) for drop (add) in which each input (output) comes (goes) from (to) one of the stage 1 elements. Stage 1 to stage 2 connectivity allows wavelength of one direction to be added from (or dropped to) the node. Each connection between stage 1 and stage 2 can carry K wavelengths. The second stage is the power splitters of 1×K (or K×1 combiners) where K is the maximum number of wavelengths a chip can drop (or add). In one example, K=25. The third stage is K:1 (or 1:K) Photonic Integrated Circuit (PIC) selector switches for add (or drop). This means the waveguide interconnects per chip are reduced to M×K, which is 500 in the example where M=20 and K=25. Both second and third stages are built in silicon photonics inter-connected via stage one. Each silicon photonic chip handles K optical Channel (OCh) signals and includes:

M input fibers (1 from each WSS)
M 1:K power splitter
K M:1 selector switch, implemented with large suppression of crosstalk
K output fibers (each to 1 Rx)

In one embodiment, the implementation of a chip can assume a fixed K and M (say K=25 and M=20) and scalability is achieved by increasing both the size of stage 1 and the number of Chips. This embodiment may also require WSS components for both the add and the drop modules.

Figure 3:
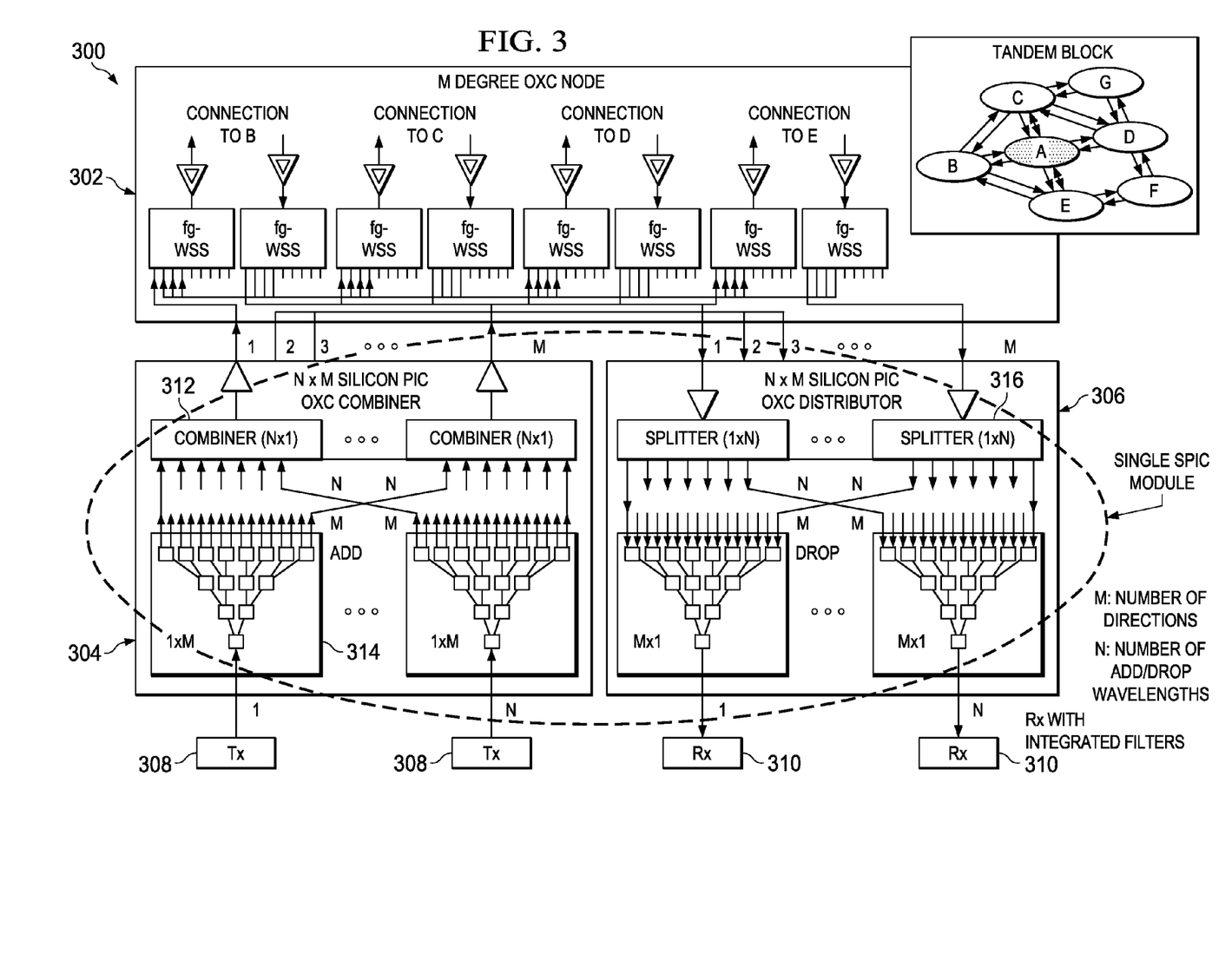
FIG. 3 shows a schematic diagram of an embodiment a silicon photonics based approach for add/drop part of a ROADM.

In an embodiment, a reconfigurable optical add/drop multiplexer (ROADM) is disclosed. The ROADM includes an M degree optical cross-connect (OXC) tandem component comprising M wavelength selective switches (WSSs) coupled to M wavelength division multiplexing (WDM) node interfaces, where M is an integer; and at least one N by M OXC combiner/distributor coupled to the tandem component, wherein the combiner/distributor includes a photonic integrated circuit (PIC) where N is a number of add/drop wavelength signals. In an embodiment, the tandem component includes a first stage and the combiner/distributor includes a second stage and a third stage, wherein the second stage includes at least one of a plurality of power splitters and a plurality of power combiners, wherein the power splitters splits an input to K signals, wherein the power combiner combines K signals into an output, where K is a maximum number of wavelength signals that can be added or dropped (K<=N). In an embodiment, the case of K=N applies when N is small enough so that both splitter (for drop function) and combiner (for add function) can be implemented in a single silicon photonic chip. An embodiment example is shown in FIG. 3. In an embodiment, the case for K<N applies when the number of add/drop wavelength is large and the combiner and distributor module need to be implemented in many chips. Embodiment examples are described below with reference to FIGS. 4, 5 and 6. In an embodiment, each tandem stage output is connected to each of the at least one N by M OXC combiner/distributors where combiners perform adding traffic from any of the N transmitter to any of the M direction of the OXC node and distributors perform dropping any channel from any of the M direction to any of the N receivers. In an embodiment, the PIC chips are silicon PIC chips.

In an embodiment, the distributor includes a splitter stage and a selector stage. The splitter stage includes 1 by K power splitters where K<=N is a maximum number of wavelength signals that the ROADM can drop or add. In an embodiment, the selector stage includes M by 1 PIC Selector Switches (SS) for dropping wavelength signals, where M is the number of WDM interfaces on the optical ROADM node. The combiner includes a combiner stage K by 1 combiners (K<=N) and 1 by M Route Switches (RS) for adding wavelength signals. The ROADM includes a plurality of waveguide interconnects, wherein a total number of waveguide interconnects is M by N. In the disclosed embodiment ROADMs, multiple optical signals typically arrive at each receiver at once, wherein each of the multiple optical signals is on a different wavelength. The receiver receives only one of these wavelengths by incorporating a tunable optical filter and/or by means of a tunable local oscillator laser in the case of coherent signal transmission.

Some of the benefits provided by various embodiments of this disclosure may include Low cost, low power, less space due to use of silicon photonic integrated circuits, Scalable and Pay as you grow architecture for PIC add/drop ROADM. Embodiments of this disclosure provide a modular solution to address the challenge of massive number of waveguide interconnects for high-degree nodes based on architectural portioning of the chip components. In an embodiment, scalability is provided with stacking chips in a 3-tier (or 3-stage) architecture.

In an embodiment, a Silicon Photonic Integrated Circuit (SPIC) is used for use in add/drop ROADM. In an embodiment, the SPIC is partitioned so that it can scale to many degrees with pay as you grow capability.

Embodiments of the disclosure may be used for All-Optical Networks (AON) add/drop, high capacity optical switches operating both at the circuit level and at packet levels.

The flexibility of the optical mesh network can be extended by providing Colorless, Directionless and Contention-less (CDC) feature to add/drop ports at every node in the network. The colorless feature at a local add/drop port refers to the ability of the tunable transponders to have wavelength transparent access to all the DWDM network ports. The directionless feature at a local add/drop port refers to the ability of the transponders to have non-blocking access to all the DWDM network ports in the optical system. The Contention-less feature at the local add/drop site allows efficient usage of wavelengths and access resources. The CDC feature of the ROADM architecture enables efficient use of all the tunable access resources for on-demand and high bandwidth configuration and simplifies the network architecture.

Figure 1:
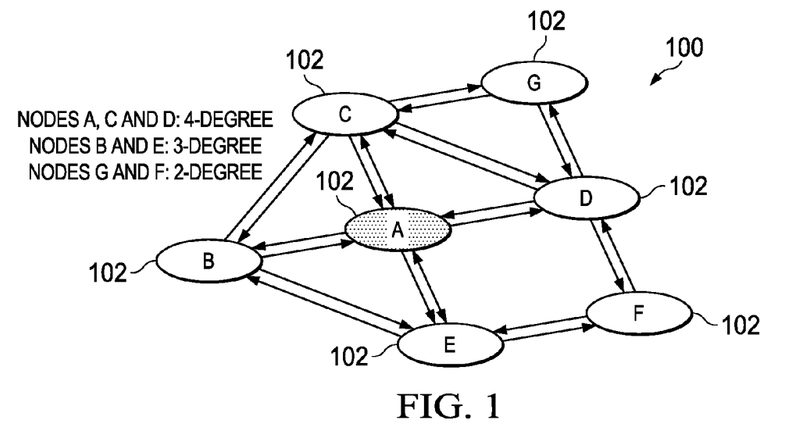
FIG. 1 shows a block diagram of an example of a multi-node all-optical network in which each node is multi-degree.

FIG. 1 shows a block diagram of an example of a multi-node all-optical network 100 in which each node is multi-degree. Network 100 includes a plurality of nodes 102 connected to each other by optical media. Each node 102 is any device capable of receiving, transmitting, adding, and dropping optical signals. In an embodiment, each node 102 is a ROADM that routes optical signals directly and avoids O-E-O conversion. The nodes 102 are labeled A, B, C, D, and E. For this example, we look at node A and its 4-degree connectivity to nodes B, C, D and E. Each node 102 includes one or more DWDM fiber interfaces.

Figure 2A:
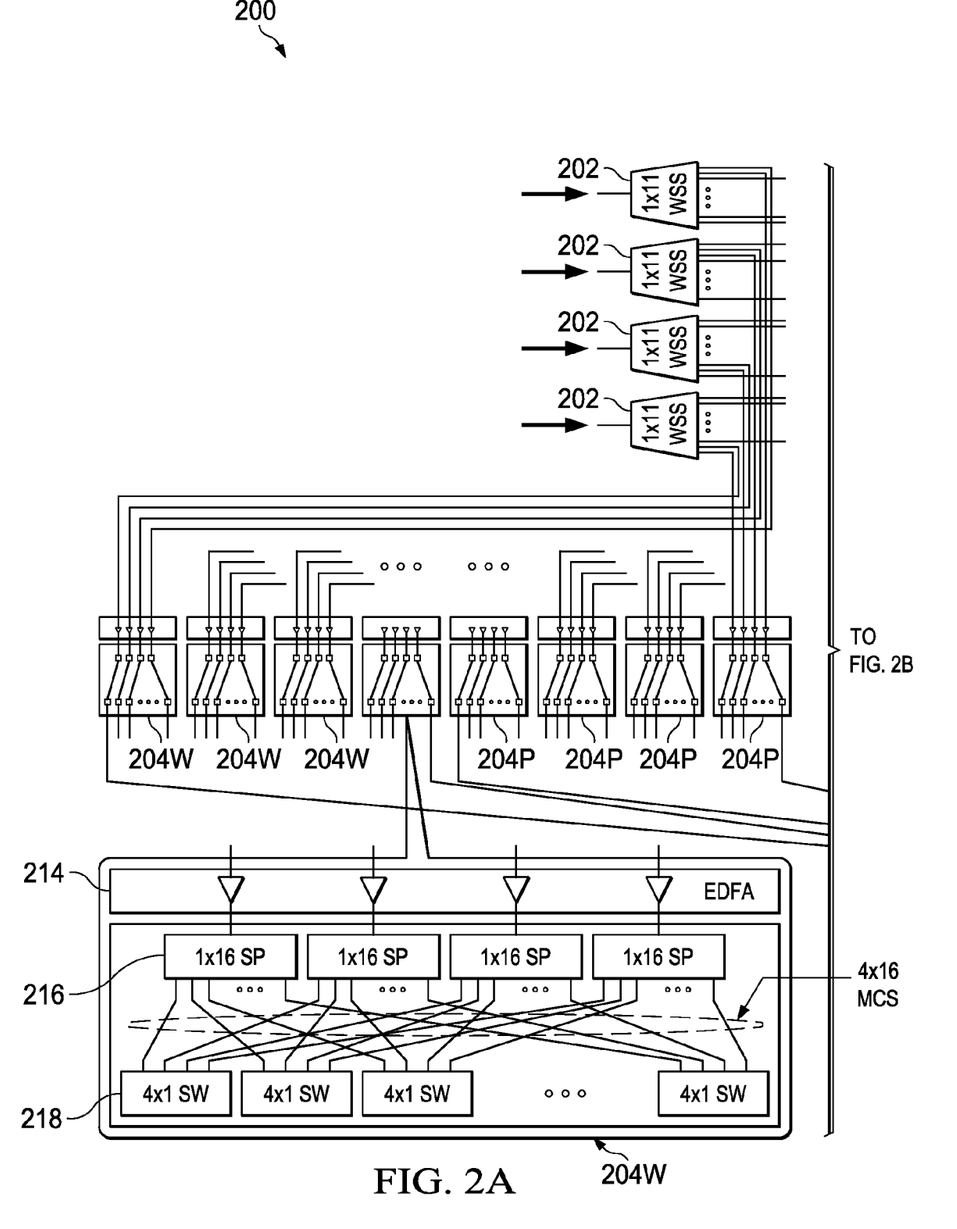
FIGS. 2A and 2B show a schematic diagram of an architecture of an existing implementation of a ROADM.
Figure 2B:
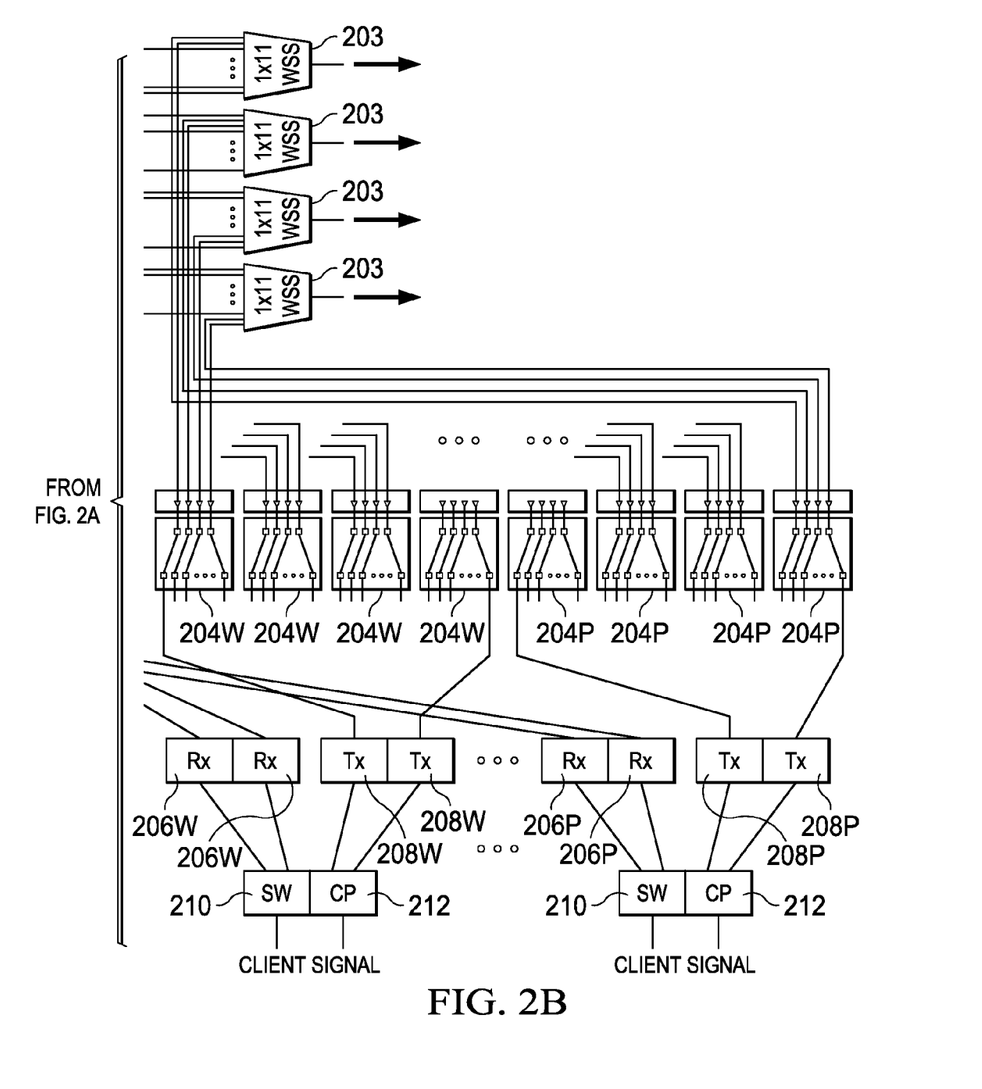

FIGS. 2A and 2B show a schematic diagram of an architecture of an existing implementation of a ROADM 200 with four directions (M=4). The ROADM 200 includes four input WSSs 202 and four output WSS 203 connected to 16 Multi-cast Switch (MCS) switches 204 (8 MCS switches 204 per WSS 202, 203). Each MCS switch 204 includes an EDFA 214, four 1×16 splitters (SP) 216, and sixteen 1×4 switches (SW) 218. Each MCS 204 is connected to either a receiver (Rx) 206 or a transmitter (Tx) 208. The MCS 204 is split into working and protection groups. Eight MCS 204 for working and eight MCS 204 for protection. Four of MCS 204 are connected to working (RX 206W) and the other four connected to protection (RX 206P). Another four MCS are connected to working TX 208W and four others are connected to protection TX 208P. Both 206W and 206P are connected to switch 210 to select the received signal from either of the working or protection path. Similarly, both 208W and 208P are connected to 212 coupler (CP) to connect the transmitted signal to working and protection paths.

The ROADM 200 example assumes a 4-degree node (hence 4×80=320 wavelengths), 20% add/drop of the wavelengths (hence sixty-four wavelengths can be add/drop to this node), and two WSS per direction (eight WSS in this example). The size of WSS is 1×11 where three of the eleven connections are used to connect to three remaining directions and eight connections are used to connect to eight MCS switches with size of 4×16. The example further assumes a 1+1 protected add/drop with multicast switches of 4×16 meaning that it requires two-hundred fifty-six 4×1 switches and sixty-four 1×16 splitters.

FIG. 3 shows a schematic diagram of an embodiment a silicon photonics based approach for add/drop part of a ROADM 300. ROADM 300 includes a tandem block 302 and an add/drop block 304. The add/drop block 304 for M WDM interfaces direction and one add blocks 304 (or drop block 306), includes:

For Add block 304:
N inputs and M outputs;
N 1×M switches, each switch is built using 1×2 switching elements implemented in Photonic Integrated Circuit (PIC)—an example of such implementation is The Mach-Zehnder interferometer (MZI);

M 1×N combiners 312, each combiner built using 2×1 switching elements 314 in a multi-stage system; and M×N waveguides connecting N 1×M switches to M N×1 combiners 312.

For Drop block 306

M inputs and N outputs;

N M×1 switches, each switch is built using 2×1 switching elements 318 implemented in Photonic Integrated Circuit (PIC);

M 1×N splitter 316, each splitter 316 built using 1×2 switching elements in a multi-stage system; and M×N waveguides connecting N M×1 switches to M N×1 splitters 316.

In an embodiment, the combiner 304 and distributor 306 are implemented in a single SPIC module 320. The combiner 304 is coupled to N transmitters 308 and the distributor 306 is coupled to N receivers 310.

Using Silicon Photonic Integrated Circuit (SPIC) for add/drop modules of ROADM reduces cost, size and power. To quantify the benefits of using SPIC, a comparison of the components, size, power and cost metrics for both traditional approach for the 4-degree node of FIGS. 2A and 2b and the SPIC-based node of FIG. 3 is provided. Table 1 shows a comparison between the two approaches.

these wavelengths meaning the total number of add/drop of five-hundred. To build a silicon photonic chip that can drop 500 wavelengths on each of the receivers from any twenty directions requires 20×500=10000 waveguides inside the chip. This is impossible to build unless a novel architecture is defined allowing partition of ROADM add/drop elements and its waveguide interconnects into pieces that can be designed in silicon photonics and can be scaled as both the number of directions and the number of add/drop wavelength per direction increases.

Figure 4:
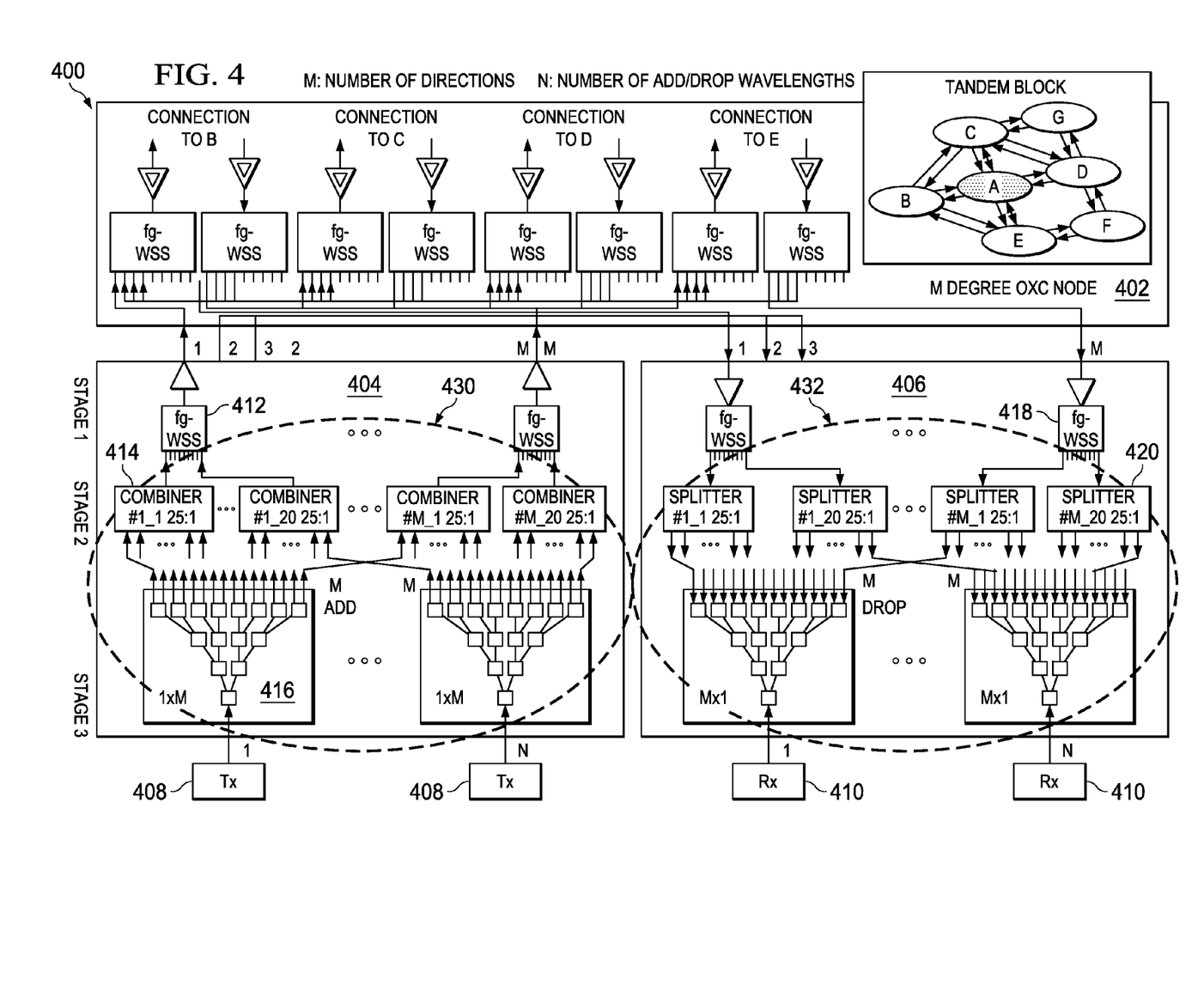
FIG. 4 is a schematic diagram of an embodiment three stage ROADM add/drop module.

FIG. 4 is a schematic diagram of an embodiment three stage ROADM SPIC 400. ROADM SPIC 400 includes a tandem component 402, a combiner 404, and a distributor 406. The tandem block (or component) 402 includes a connection (transmitter and receiver) to each of a plurality of other nodes in an optical network. The tandem block includes a plurality of either fixed grid or flexible grid (fg) WSSs (at least two for each connection) and each connection is coupled to an input or output of each of the combiner 404 and distributor 406. The fg-WSSs are unidirectional components. The combiner 404 includes three stages. The first stage of the combiner 404 includes a plurality of fg-WSSs 412 with the output of each fg-WSS 412 coupled to one of the connections in the tandem block 402. Similarly, the first stage of the

TABLE 1

Size, cost, and power comparisons of two approaches for 4-degree 20% add/drop.

|  | Traditional Module Based Approach 16 units of 4 × 16 MCS | SPIC—Single PIC chip implementation to perform same function as 16 units of 4 × 16 |
|---|---|---|
| Splitters | 64 modules of 1 × 16 splitter | ½ chip (contains 64 units of 1 × 16 splitter) |
| Switches | 256 modules of 4 × 1 switch | ½ Chip (contains 256 units of 4 × 1 switch) |
| Estimated Space Requirement | TOTAL = 4464 cm$^3$ Switch: 12 × 24 × 60 mm 1 × 16 PLC splitter: 40 × 4 × 4 mm | TOTAL: 25 cm3 Packaged chip: 50 mm × 50 mm (<10 mm height) Splitter cells area: 960 × 0.11 mm$^2$/cell = 106 mm$^2$ Switch cells area: 768 × 0.11 mm$^2$/cell- 85 mm$^2$ |
| Power | Estimated - 332 W Reference Switch: 1300 mW +/− 10% | Estimated: <35 W |
| Connector Cost | High | Very low |
| Interconnect | Manually connected fiber harness, large additional space is needed | Defined lithographically, included in the chip |
| Relative Cost | $$$$$ | $$ |

Examining the comparison shown in Table 1 reveals a number of distinctions between a traditional modular based approach and a SPIC based approach for a 4-direction, 20% add/drop example. For example, regarding the components, all of the switches, splitters and combiners can be integrated into one chip in the SPIC based approach whereas, the traditional method requires hundreds of modules. Additionally, the total space required by SPIC is hundreds of time smaller than traditional method. The power consumption in using SPIC is one tenth of the power of traditional ROADM. Furthermore, the relative cost of a SPIC based ROADM node is much lower than the traditional method since the traditional method requires significant connector and fiber costs.

The above comparison just shows how the use of SPIC can reduce size, power and cost. However, scaling SPIC to many directions (say twenty directions with each direction supporting eighty wavelengths) requires a massive number of waveguides inside the chip. To illustrate this, assume that it is required for a node to support add/drop of about one-third of distributor 406 includes a plurality of fg-WSSs 418 with the input of each fg-WSS 418 coupled to one of the connections in the tandem block 402. The fg-WSSs 412, 418 may be referred to as routing stage WSS. The second and third stages (indicated by a dashed oval in FIG. 4) of the combiner 404 are implemented in silicon PIC and are referred to as the PIC modules 430, 432.

A subset of the receivers 410 are connected to one of the PIC chips that implement module 432. When an optical signal is to be dropped, the control system determines which receiver subset contains the destination receiver for that signal. Each routing stage drop WSS 418 serves the following purpose. Every optical signal from one of the M inputs that needs to be dropped at this node 400 is passed by the tandem stage (or tandem component) 402 to the associated one of the routing stage drop WSS 418. In other words, one routing stage drop WSS 418 looks after all the drop traffic from one of the line-side inputs. The routing stage drop WSS 418 routes zero or more optical signals (each of a different wavelength)

to the appropriate PIC chip in module 432, so that the PIC chip may direct the optical signal to the appropriate destination receiver.

A subset of the transmitters 408 are connected to one of the chips in the entire PIC module 430. When an optical signal is to be added to a direction on a given wavelength, the control system determines which chip is connected to the transmitter of that signal. The direction determines which WSS 412 should serve the connection. The transmitter is then tuned to the wavelength that it needs to be connected and the control system establishes a connection from transmitter to 1×M switch to designated N×1 combiner to the designated WSS 412 that serves that direction. In other words, one routing stage add WSS 412 looks after all the add traffic for a given direction from any of the N inputs.

In an embodiment, the disclosed ROADMs are implemented using a scalable SPIC and provides pay as you grow benefits. In an embodiment, the scaling of SPIC based add/drop with pay as you grow feature is based on an elegant partitioning of the add/drop PIC chip in such a way that:
 a) The waveguide interconnection is manageable within a chip
 b) It scales as the number of ROADM direction increases
 c) It scales as the number of wavelength added (or dropped) per direction increases.
 d) Offer a low-cost solution with pay as you grow capability In an embodiment, it is assumed that any permutation of input signals to a node from any direction can be dropped to any permutation of Rx, any permutation of output signals of any degree can be added from any permutation of Tx, and Tx and Rx can tune across the whole spectrum. It is also assumed that if more limited capability is needed, then the add/drop architecture can be simplified as needed. Silicon photonics is used in the add functional block and drop functional block.

Disclosed herein is the use of a three-stage architecture for each RX (or TX) chip. Using this three stage architecture as described below, will lead to an elegant partition of the chip and allow one chip per direction, hence, pay as you grow.

Stage one: This stage is part of the tandem (or transit) stage and it is implementation specific. In one embodiment, stage one is either a fixed grid or flex-grid WSS of 1×M where M is the number of directions. In another embodiment, when technology allows, stage one is silicon photonics. Each output of stage one is connected to stage two of all the chips in the node. This means that a chip has M by N input/outputs.

Stage two: The second stage is the power splitters or combiners that splits to K signals or combines K signals. There are M splitters for drop and M combiners for add functions. K is the maximum number of wavelength a chip can drop or add. Each connection between stage one and stage two can carry K wavelengths. The value of K is determined by add/drop percentage rate, i.e., K=p*80, where p is the add/drop rate. For next generation ROADM, p is assumed to be one-third. As a result, is can be assumed that K=25 in an embodiment.

Stage three: The third stage for drop function is collection of a set of K switches each with M inputs to one outputs or one input can go to any of the K outputs. The third stage for drop function is collection of K switches each with 1 input and M outputs.

In an embodiment, both second and third stages are built in silicon photonics. Each silicon photonic chip handles K optical Channel (OCh) signals. The add module 404 will have K input and M outputs, whereas the drop module 406 will have M inputs and K outputs. The add module 404 and drop module 406 both consist of N/K=M functional blocks, where these blocks can be organized in any plurality for silicon photonic chip implementations. In an embodiment K<<N. In an embodiment both the add module 406 and the drop module 406 are implemented on a single chip.

FIG. 4 shows the three stages. Based on the above description, the connectivity of each add/drop node 404, 406 is partitioned such that each add/drop can be implemented in a silicon photonic chips and scale with pay as you grow capability.

Figure 5:
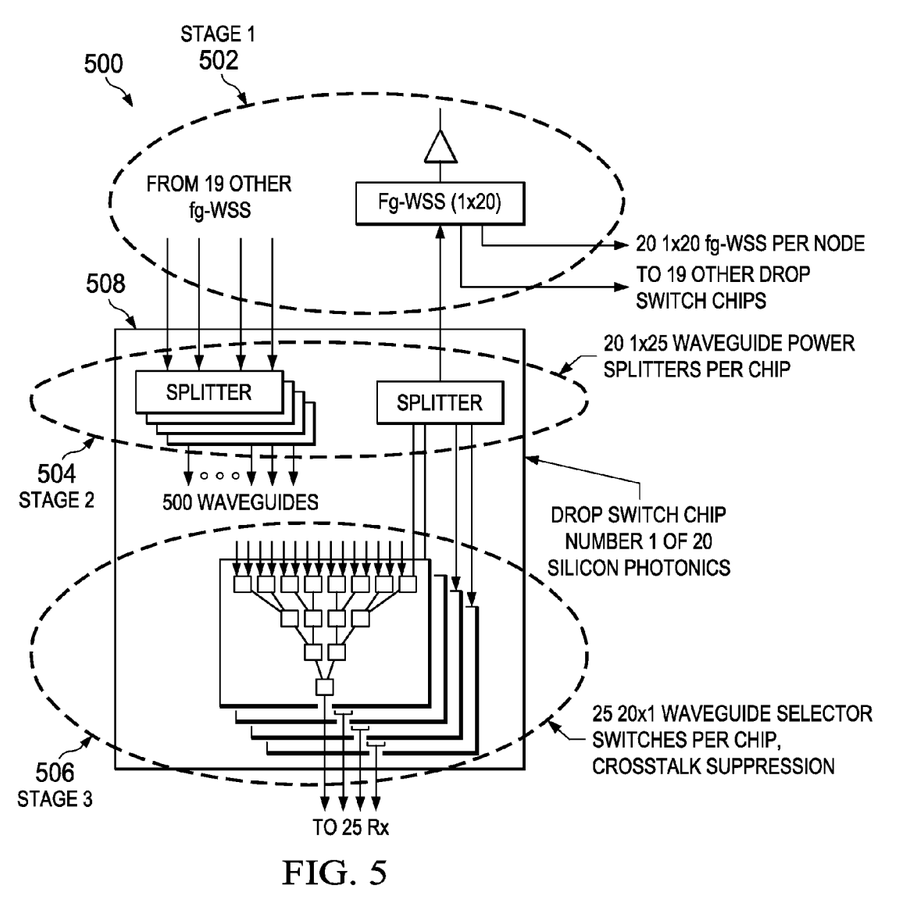
FIG. 5 shows a schematic diagram of an embodiment architecture for a drop module with M=20 and K=25 (25/80=31% drop rate)

FIG. 5 shows a schematic diagram of an embodiment architecture for a drop module 500. Drop module 500 may be implemented as part of an add/drop node. Drop module 500 includes a first stage (stage one) 502, a second stage (stage two) 504, and a third stage (stage three) 506. The second stage 504 and the third stage 506 form a drop switch chip 508 that is implemented in a SPIC. In an embodiment, the first stage 502 includes twenty (M) 1×20 (1×M) fg-WSS per node with one output connected to a splitter in the second stage 504 of the drop switch chip 508 and nineteen other outputs connected to nineteen (M−1) other drop witch chips. In an embodiment, there are twenty 1×25 waveguide power splitters per chip. The second stage 504 includes twenty splitters each connected to an output of each one of twenty 1×20 fg-WSSs. An output of each splitter is connected to the third stage 506. In an embodiment, there are twenty-five (K) 20×1 (M×1) selector switches per chip with crosstalk suppression.

In an embodiment, each all-optical node can have a maximum of 20 input fibers, one for each degree. Further, in an embodiment, each input fiber contains from 0 to 80 optical signals, each signal having a flexible spectral width. The total number of optical signals summed across the twenty (M) input fibers that dropped to this node (or added from this node) is five hundred. Each output fiber of drop module 500 contains one optical signal and connects directly to one Rx.

The drop block 508 could be a single chip or half of a chip where the other half is the add block. In an implementation, there is one chip per direction for add and one chip per direction for drop. Let us look at chip s for direction s, where s={1,2, . . . , M}.

Stage 1 504 is implementation specific. In one embodiment it is fixed or flex grid WSS of 1×M where M=20 is the number of directions. Input to this stage is from direction s and the M outputs are connected to all the drop chips (or blocks if the drop is part of a chip). One of the M outputs is connected directly to chip (or block) s, while the other M−1 outputs are connected to M−1 other chips. Since each output of stage one 502 is connected to stage two 504 of all the chips in the drop module 500, it means that a drop chip has M input each coming from one of the stage one element 502. Stage one 502 to stage two 504 connectivity allows wavelengths from each directions to be dropped to each of the receivers.

The second stage 504 is the power splitters of 1×K, where K is the maximum number of wavelength a chip can drop. In the illustrated example, K=25 which is about one-third of the eighty wavelengths. The total number of such power splitter is four-hundred, however, with partitioning to M=20 drop chips/modules, each chip 508 has twenty such splitters.

The third stage 506 is K:1 SPIC selector switches for drop. Total number of such selector switch for a node (e.g., drop module 500) is five-hundred, however, with partitioning to M=20 drop chips/modules, each chip 508 has twenty-five of such selector switches. This partitioning allows the waveguide interconnects per chip be reduced to M×K=500 waveguides that is implementable in silicon photonics. In embodiment, both the second stage 504 and the third stage 506 are built in silicon photonics. Each silicon photonic chip 508 handles K optical Channel (OCh) signals.

In an embodiment, each of the twenty-five sets of 20×1 Selector Switch (SS) on the drop block 508 includes crosstalk suppression by means of an additional layer of twenty 1×2 switches incorporated within each of the twenty-five sets of Selector Switches (SSs). One purpose of the SSs is to select one optical path out of twenty inputs. The 2×1 switch elements may be implemented in silicon chip technology. Therefore, an on-off gate may be inserted into the signal path as the light enters the SS. This helps to block unwanted input light more strongly.

As a result, in an embodiment, as shown in FIG. 5, each silicon photonic drop module 500 handles 25 OCh signals and includes 20 input fibers (1 from each WSS), twenty 1:25 power splitter, twenty-five 20:1 selector switches implemented with large suppression of crosstalk, and twenty-five output fibers (each to 1 Rx). In an embodiment, all of these elements may fit on a single chip or part of a chip.

In an embodiment, the drop module 500 includes polarization diversity and has two output fibers to each Rx, each carrying one polarization.

Figure 6:
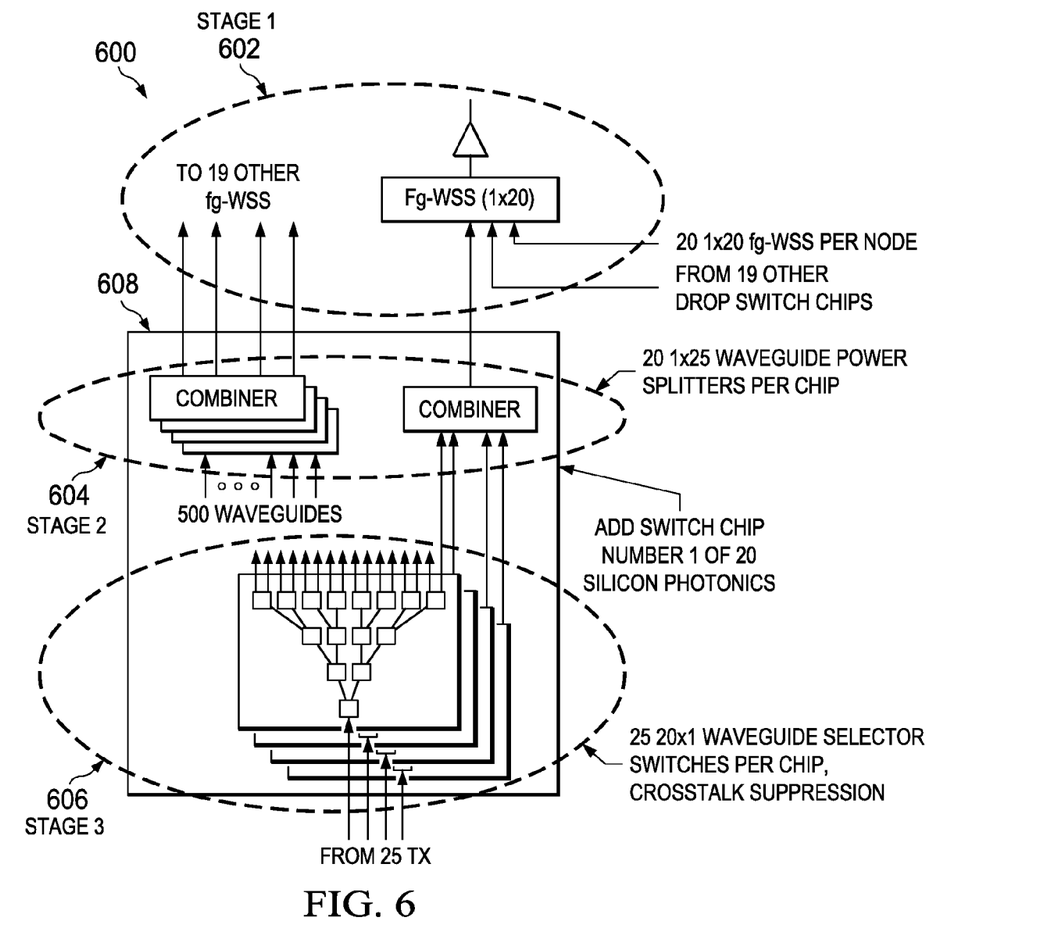
FIG. 6 shows a block diagram of an embodiment of an architecture for an add module with M=20 and K=25 (25/80=31% add rate).

FIG. 6 shows a schematic diagram of an embodiment of an architecture for an add module 600. Add module 600 includes three stages: stage one 602, stage two 604, and stage three 606. Stage 2 604 and stage three 606 form an add switch chip 608 that is implemented in a SPIC. In an embodiment, the add module 600 has the same architecture as the drop module 500 shown in FIG. 5, but used the other way round as shown in FIG. 6. In an embodiment, the actual photonic components are not identical, but they are similar and the scalability and partitioning are the substantially the same. For instance power splitters in stage two 504 of drop module 500 are changed to power combiners in stage two 604 of the add module 600 and routing switches are used instead of selector switches. Another change is in stage one 602, where 20×1 flex WSS (or regular WSS) are used instead of the 1×20 flex WSS (or regular WSS) of the drop architecture. It should be noted that amplifier requirements for add module 600 and drop module 500 are different.

The various embodiments have been described primarily with reference to the working path. However, those of ordinary skill in the art will appreciate that the same description applies to both the working and the protection paths for 1+1 protections or 1:P protections, where P is the number of chips that are protected by one stand-by chip when a failure occurs. When a failure occurs in a chip, the stand-by chip takes over performance of the functions performed by the failed chip. In the case of 1+1 protection, the input to the distributor module is 2×M, the output from the combiner is 2×M, and there is duplication in all stages. In an embodiment, for 1:P protection, there is an additional chip for every P chips. The number P is selected to achieve an acceptable availability target.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A reconfigurable optical add/drop multiplexer (ROADM) comprising:
    an M degree optical cross-connect (OXC) tandem component comprising M wavelength selective switches (WSSs) coupled to M wavelength division multiplexing (WDM) node interfaces, where M is an integer, and is equal to a number of input directions or a number of output directions;
    a routing stage wavelength selector switch (WSS) comprising a plurality of WSSs connected to the tandem component, wherein the WSSs are unidirectional components; and
    at least one N by M OXC combiner/distributor coupled to the routing stage WSS, wherein the combiner/distributor is configured to perform add/drop functions, and wherein the combiner/distributor comprises at least one photonic integrated circuit (PIC) where N is a maximum number of add/drop wavelength signals that the ROADM can add or drop;
    wherein the routing stage comprises a first stage and the combiner/distributor each comprises a second stage and a third stage, wherein the second stage comprises at least one of a plurality of power splitters for distributor and a plurality of power combiners for combiner, wherein the power splitters splits an input to K signals, wherein the power combiner combines K signals into an output, where K is a maximum number of wavelength signals that can be added or dropped.

2. The ROADM of claim 1, wherein the combiner/distributor comprises a combiner and a distributor, wherein the distributor comprises a splitter stage and a selector stage, and wherein the combiner comprises a combiner stage and a routing selector stage.

3. The ROADM of claim 2, wherein the splitter stage comprises 1 by K power splitters where K is a maximum number of wavelength signals that the ROADM can drop or add.

4. The ROADM of claim 2, wherein the selector stage comprises K 1 by M PIC route select switches for adding wavelength signals, where K is a maximum number of wavelength signals that can be added to the ROADM and M is a number of WDM interfaces.

5. The ROADM of claim 2, wherein the selector stage comprises K M by 1 PIC selector switches for dropping wavelength signals, where K is a maximum number of wavelength signals that can be dropped by the ROADM and M is number of WDM interfaces.

6. The ROADM of claim 1, further comprising a plurality of waveguide interconnects, wherein a total number of waveguide interconnects is M by N.

7. The ROADM of claim 1, wherein each tandem stage output is connected to each of the at least one N by M OXC combiner/distributors.

8. The ROADM of claim 1, wherein the PIC is a silicon photonic integrated circuit.

9. The ROADM of claim 1, wherein the combiner/distributor comprises cross talk suppression.

10. The ROADM of claim 1, wherein M=N/K, for K<<N wherein K is a maximum number of wavelength signals that can be added or dropped by each one of the at least one PIC of the ROADM.

11. The ROADM of claim 1, further comprising at least one stand-by chip protecting the PIC, wherein the stand-by chip comprises at least one K by M second OXC combiner/distributor coupled to the routing stage WSS, where K<=N, wherein the second OXC combiner/distributor is configured to perform add/drop functions when the PIC fails, wherein the second OXC combiner/distributor comprises a second PIC, and wherein K is a maximum number of wavelength signals that can be added or dropped by the at least one stand-by chip.

12. A reconfigurable optical add/drop multiplexer (ROADM) comprising:
   a tandem stage, wherein the tandem stage comprises an M degree optical cross-connect (OXC) tandem component;
   a first stage coupled to the tandem stage, wherein the first stage comprises a plurality of wavelength selective switches (WSSs);
   a second stage coupled to the first stage, wherein the second stage comprises a photonic integrated circuit (PIC) and wherein the second stage comprises at least one of a plurality of power splitters and a plurality of power combiners, wherein the power splitters splits an input to K signals, wherein the power combiner combines K signals into an output, where K is a maximum number of wavelength signals that can be added or dropped; and
   a third stage coupled to the second stage, wherein the third stage comprises the PIC and wherein the third stage comprises a plurality of selector switches.

13. The ROADM of claim 12, wherein the first stage comprises M WSSs coupled to M wavelength division multiplexing (WDM) node interfaces, where M is an integer.

14. The ROADM of claim 12, wherein the third stage comprise K M by 1 PIC selector switches for adding wavelength signals, where K is a maximum number of wavelength signals that can be added to the ROADM and M is a degree of ROADM node.

15. The ROADM of claim 12, wherein the third stage comprises a by K 1 by M PIC selector switches for dropping wavelength signals, where K is a maximum number of wavelength signals that can be dropped by the ROADM and M is the degree of the ROADM.

16. The ROADM of claim 12, further comprising a plurality of waveguide interconnects, wherein a total number of waveguide interconnects is M by K.

17. The ROADM of claim 12, further comprising a plurality of second stages and a plurality of third stages.

18. The ROADM of claim 17, wherein each tandem stage output is connected to each of a plurality of second stage components.

19. The ROADM of claim 12, wherein the PIC is a silicon PIC.

20. The ROADM of claim 12, wherein the third stage comprises cross talk suppression.

21. The ROADM of claim 12, wherein M=N/K, for K<<N, wherein K is a maximum number of wavelength signals that can be added or dropped by each one of the at least one PIC of the ROADM.

22. A network component in an optically switched network, comprising:
   a tandem stage comprising an M degree tandem component, where M is a number of connections to other network components within the optically switched network; and
   an add/drop stage comprising a plurality of first sub-stages, a plurality of second sub-stages, and a plurality of third sub-stages, wherein corresponding ones of the second sub-stage and the third sub-stage comprise at least a portion of one of a plurality of photonic integrated circuit (PIC) chips wherein a number of PIC chips is equal to M, wherein each output or input of the tandem stage is connected to each of the PIC chips, wherein the first stage comprises a plurality of fixed grid or flex grid wavelength selective switches (WSSs), wherein the second stage comprises at least one of a plurality of power splitters and a plurality of power combiners, wherein the power splitters splits an input to K signals, wherein the power combiner combines K signals into an output, where K is a maximum number of wavelength signals that can be added or dropped, and wherein the third stage comprises a plurality of selector switches coupled to the second stage.

23. The network component of claim 22, wherein at least some of the third stages comprise K M by 1 PIC selector switches for adding wavelength signals, where K is a maximum number of wavelength signals that can be added to the network component.

24. The network component of claim 22, wherein at least some of the third stages comprise a by K 1 by M PIC selector switches for dropping wavelength signals, where K is a maximum number of wavelength signals that can be dropped by the network component.

25. The network component of claim 22, further comprising a plurality of waveguide interconnects, wherein a total number of waveguide interconnects is M by K.

26. The network component of claim 22, wherein the tandem component comprises an M degree optical cross-connect (OXC) tandem component comprising M wavelength selective switches (WSSs) coupled to M wavelength division multiplexing (WDM) node interfaces.

27. The network component of claim 22, wherein the PIC chips are silicon PIC chips.

28. The network component of claim 22, wherein each stage three comprises cross talk suppression.

29. The network component of claim 22, wherein M=N/K, for K<<N, wherein K is a maximum number of wavelength signals that can be added or dropped by each one of the PIC chips of the network component.

* * * * *